United States Patent
Shpik

(10) Patent No.: US 11,065,827 B2
(45) Date of Patent: Jul. 20, 2021

(54) THERMOPLASTIC COMPOSITE IN-SITU MELT PROCESSING METHOD FOR COMPOSITE OVERWRAPPED TOOLS

(71) Applicant: Teijin Carbon America, Inc., Rockwood, TN (US)

(72) Inventor: Peter Shpik, Knoxville, TN (US)

(73) Assignee: Teijin Carbon America, Inc., Rockwood, TN (US)

( * ) Notice: Subject to any disclaimer, the term of this patent is extended or adjusted under 35 U.S.C. 154(b) by 195 days.

(21) Appl. No.: 16/240,333

(22) Filed: Jan. 4, 2019

(65) Prior Publication Data

US 2019/0322058 A1 Oct. 24, 2019

Related U.S. Application Data

(63) Continuation-in-part of application No. 15/340,005, filed on Nov. 1, 2016, now abandoned.
(Continued)

(51) Int. Cl.
| | | |
|---|---|---|
| *B29C 70/34* | (2006.01) | |
| *B32B 27/04* | (2006.01) | |

(Continued)

(52) U.S. Cl.
CPC ............ *B29C 70/34* (2013.01); *B29C 70/16* (2013.01); *B29C 70/38* (2013.01); *B29C 70/682* (2013.01);
(Continued)

(58) Field of Classification Search
CPC ....... B29C 70/34; B29C 70/682; B29C 70/86; B29C 70/865; B29C 70/16; B29C 70/38;
(Continued)

(56) References Cited

U.S. PATENT DOCUMENTS

| 4,804,427 A | 2/1989 | Paul |
| 4,864,964 A | 9/1989 | Hilakos |

(Continued)

FOREIGN PATENT DOCUMENTS

| EP | 0415207 | 8/1990 |
| EP | 2548720 | 1/2013 |
| WO | WO2006076029 | 7/2006 |

OTHER PUBLICATIONS

ASTM Guide designation E2981-15 (Standard Guide for Nondestructive Testing of the Composite Overwraps in Filament Wound Pressure Vessels Used in Aerospace Applications; Published Sep. 2015). (Year: 2015) (Year: 2015).*

(Continued)

*Primary Examiner* — Jacob T Minskey
*Assistant Examiner* — S. Behrooz Ghorishi
(74) *Attorney, Agent, or Firm* — Pitts & Lake, P.C.

(57) ABSTRACT

An in-situ melt processing method for forming a fiber thermoplastic resin composite overwrapped workpiece, such as a composite overwrapped pressure vessel. Carbon fiber, or other types of fiber, are combined with a thermoplastic resin system. The selected fiber tow and the resin are prepared for impregnation of the tow by the resin. The resin is melted; and, carbon fiber is impregnated with the melted resin at the filament winding machine delivery head. The molten state of the composite is maintained and is applied, in the molten state, to the heated surface of a workpiece. The portion of the surface being wrapped is heated to the melting point of the thermoplastic resin so that the molten composite more efficiently adheres to the heated surface of the workpiece and so that the uppermost layer of fiber resin composite is molten when overwrapped resulting in better adherence of successive layers to one another.

18 Claims, 12 Drawing Sheets

Related U.S. Application Data

(60) Provisional application No. 62/249,467, filed on Nov. 2, 2015.

(51) Int. Cl.

| | | |
|---|---|---|
| *B32B 5/08* | (2006.01) | |
| *B32B 7/10* | (2006.01) | |
| *B32B 27/08* | (2006.01) | |
| *B32B 27/34* | (2006.01) | |
| *B32B 27/28* | (2006.01) | |
| *B32B 27/32* | (2006.01) | |
| *D04H 3/12* | (2006.01) | |
| *D04H 3/04* | (2012.01) | |
| *B29C 70/86* | (2006.01) | |
| *B29C 70/16* | (2006.01) | |
| *B29C 70/38* | (2006.01) | |
| *B29C 70/68* | (2006.01) | |
| *B29K 23/00* | (2006.01) | |
| *B29K 71/00* | (2006.01) | |
| *B29K 77/00* | (2006.01) | |
| *B29K 277/00* | (2006.01) | |
| *B29K 309/08* | (2006.01) | |
| *B29K 101/12* | (2006.01) | |
| *B29K 105/08* | (2006.01) | |
| *B29K 307/04* | (2006.01) | |
| *B29L 31/00* | (2006.01) | |

(52) U.S. Cl.
CPC ............ *B29C 70/86* (2013.01); *B29C 70/865* (2013.01); *B32B 5/08* (2013.01); *B32B 7/10* (2013.01); *B32B 27/04* (2013.01); *B32B 27/08* (2013.01); *B32B 27/28* (2013.01); *B32B 27/285* (2013.01); *B32B 27/288* (2013.01); *B32B 27/32* (2013.01); *B32B 27/34* (2013.01); *D04H 3/04* (2013.01); *D04H 3/12* (2013.01); *B29K 2023/06* (2013.01); *B29K 2023/12* (2013.01); *B29K 2071/00* (2013.01); *B29K 2077/00* (2013.01); *B29K 2101/12* (2013.01); *B29K 2105/0872* (2013.01); *B29K 2277/10* (2013.01); *B29K 2307/04* (2013.01); *B29K 2309/08* (2013.01); *B29L 2031/7156* (2013.01); *B32B 2250/44* (2013.01); *B32B 2260/021* (2013.01); *B32B 2260/046* (2013.01); *B32B 2262/0261* (2013.01); *B32B 2262/101* (2013.01); *B32B 2262/106* (2013.01); *B32B 2307/50* (2013.01); *B32B 2439/40* (2013.01); *C08J 2300/22* (2013.01)

(58) Field of Classification Search
CPC .. B32B 27/04; B32B 5/08; B32B 7/10; B32B 27/08; B32B 27/34; B32B 27/28; B32B 27/285; B32B 27/32; B32B 27/288; B32B 2250/44; B32B 2262/101; B32B 2260/021; B32B 2439/40; B32B 2307/50; B32B 2262/0261; B32B 2260/046; B32B 2262/106; D04H 3/12; D04H 3/04; B29K 2023/06; B29K 2023/12; B29K 2071/00; B29K 2077/00; B29K 2277/10; B29K 2309/08; B29K 2101/12; B29K 2105/0872; B29K 2307/04; C08J 2300/22; B29L 2031/7156
See application file for complete search history.

(56) References Cited

U.S. PATENT DOCUMENTS

| | | | |
|---|---|---|---|
| 5,137,766 A * | 8/1992 | Mazanek | ............... B29B 9/14 |
| | | | 174/358 |
| 5,198,173 A | 3/1993 | Terzian | |
| H1261 H * | 12/1993 | Gibson | ................... 156/169 |
| H1261 H | 12/1993 | Gibson et al. | |
| 5,822,838 A | 10/1998 | Seal | |
| RE38,433 E | 2/2004 | Seal | |
| 6,893,604 B2 | 5/2005 | Hauber | |
| 7,318,717 B2 | 1/2008 | Wood | |
| 7,641,949 B2 | 1/2010 | Delay | |
| 8,123,888 B2 | 2/2012 | Hammami et al. | |
| 8,158,245 B2 | 4/2012 | Pratte | |
| 8,449,705 B1 | 5/2013 | Rufer | |
| 8,567,467 B2 | 10/2013 | Maheshwari | |
| 2004/0163755 A1 | 8/2004 | LeBreton | |
| 2008/0020193 A1 | 1/2008 | Jange et al. | |
| 2011/0309074 A1 | 12/2011 | Thunhurst et al. | |
| 2013/0213564 A1 | 8/2013 | Souza et al. | |
| 2014/0110633 A1* | 4/2014 | Pratte | .................. B29C 33/68 |
| | | | 252/500 |
| 2015/0102037 A1 | 4/2015 | Nettis et al. | |
| 2015/0240993 A1 | 8/2015 | Delay | |
| 2015/0292677 A1 | 10/2015 | Curless et al. | |
| 2017/0361546 A1 | 12/2017 | Zhang | |

OTHER PUBLICATIONS

Viscosity—The Physics Hypertextbook (https://physics.info/viscosity/), accessed Aug. 14, 2020, first published Oct. 3, 2009 (Year: 2009).*

Performance Engineering (Coatings 101: Everything You Need to Know About Plasma Spray Coating), https://www.industrialcoat.com/coatings-101-everything-you-need-to-know-about-plasma-spray-coating/, accessed Jan. 4, 2021 (Year: 2019).*

European Patent Office, European Search Report, Form 1507S; dated Jun. 5, 2019.

European Patent Office, European Search Report; dated Jun. 2, 2020.

Egerton and Gruber "Thermoplastic Filament Winding Demonstrating Economies and Properties Via In-Situ Consolidation", Proceedings of the 33rd International SAMPE Symposium, 1988, pp. 35-46. (Year: 1988).

ASTM Guide designation E2981-15 (Standard Guide for Nondestructive Testing of the Composite Overwraps in Filament Wound Pressure Vessels Used in Aerospace Applications; Published Sep. 2015). (Year: 2015).

Japanese Patent Office, Office Action; dated Sep. 1, 2020.

Asamura Patent Office, P.C., English Translation of Japanese Patent Office Office Action.

\* cited by examiner

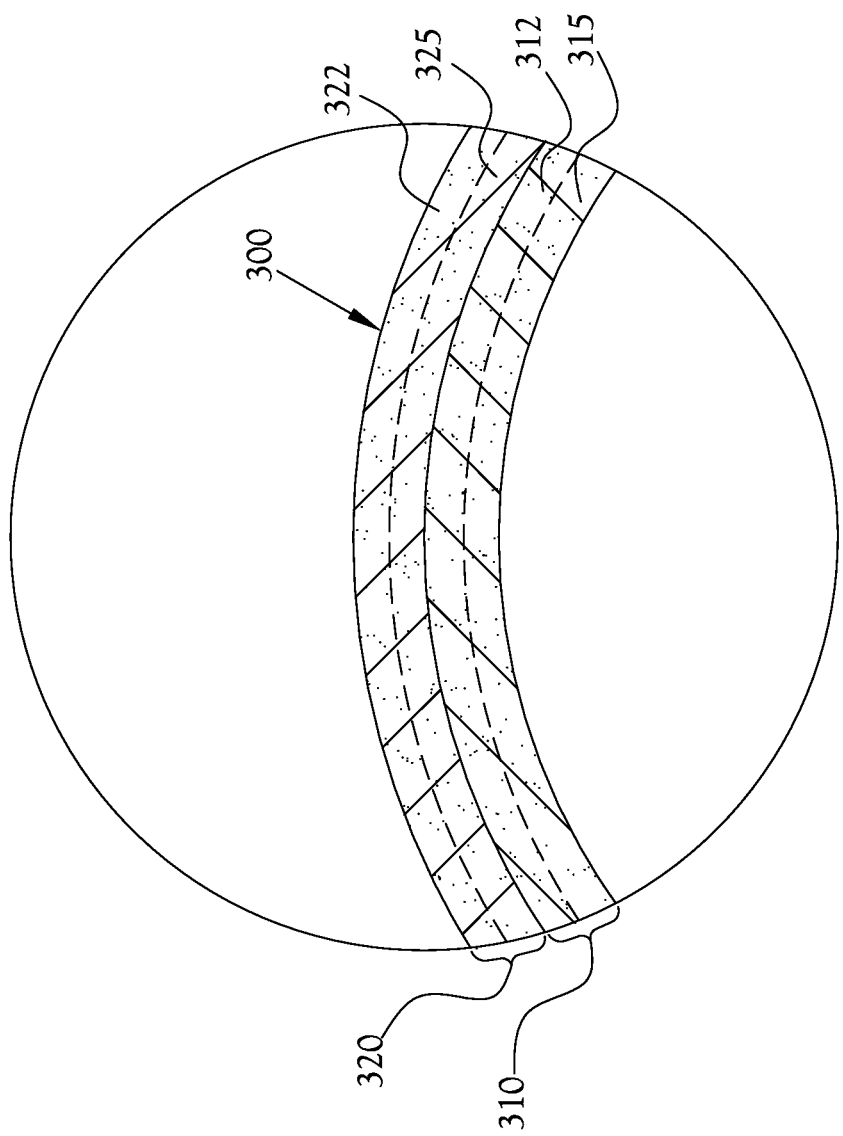
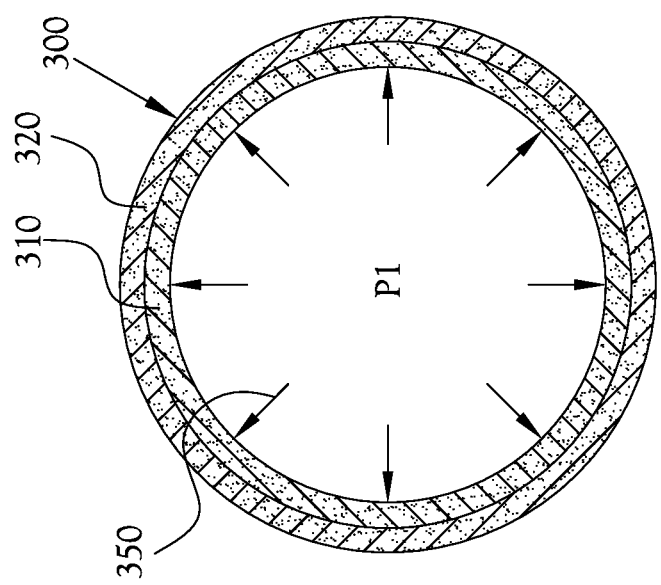
Fig.2A (PRIOR ART)
Fig.2B (PRIOR ART)

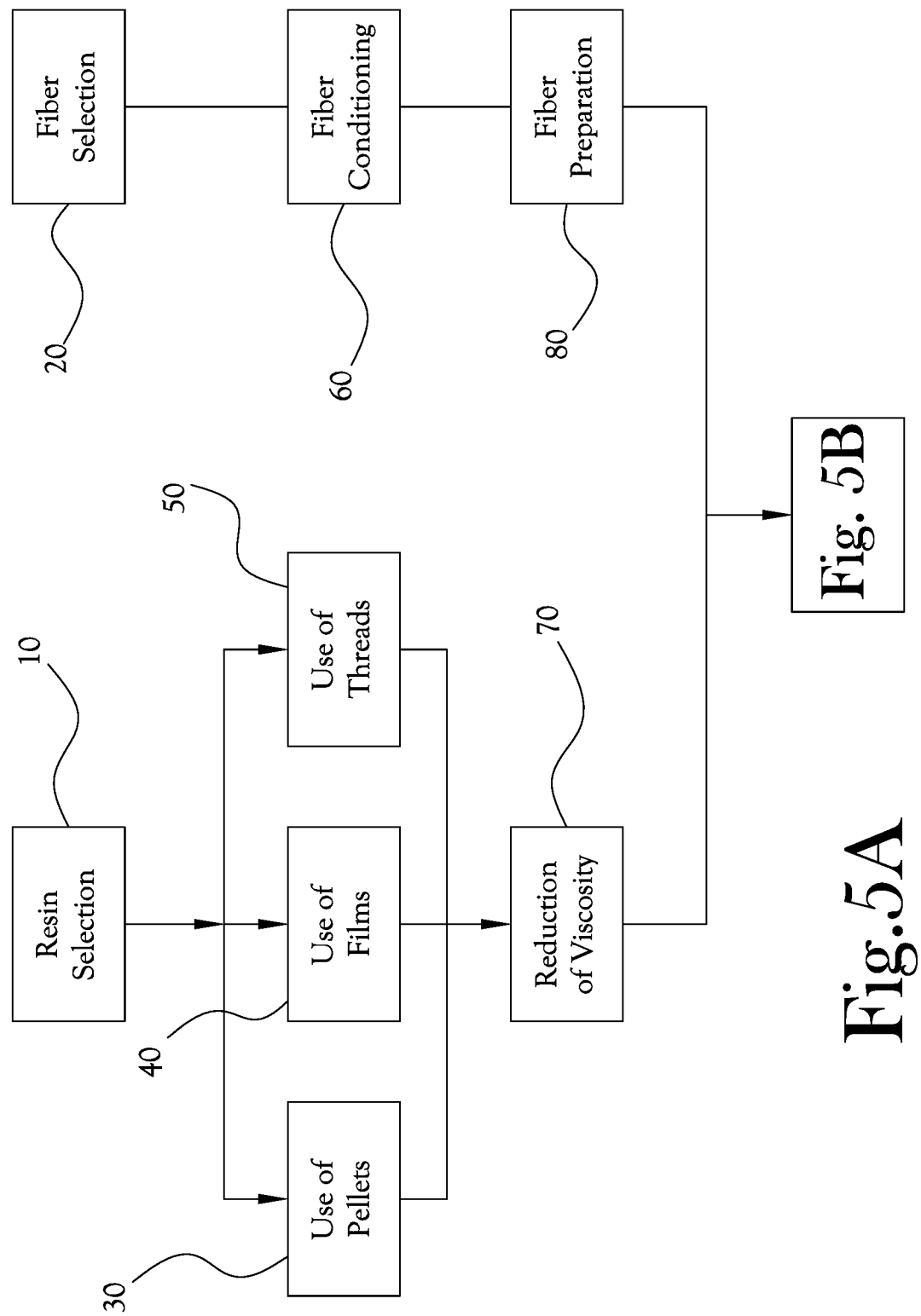

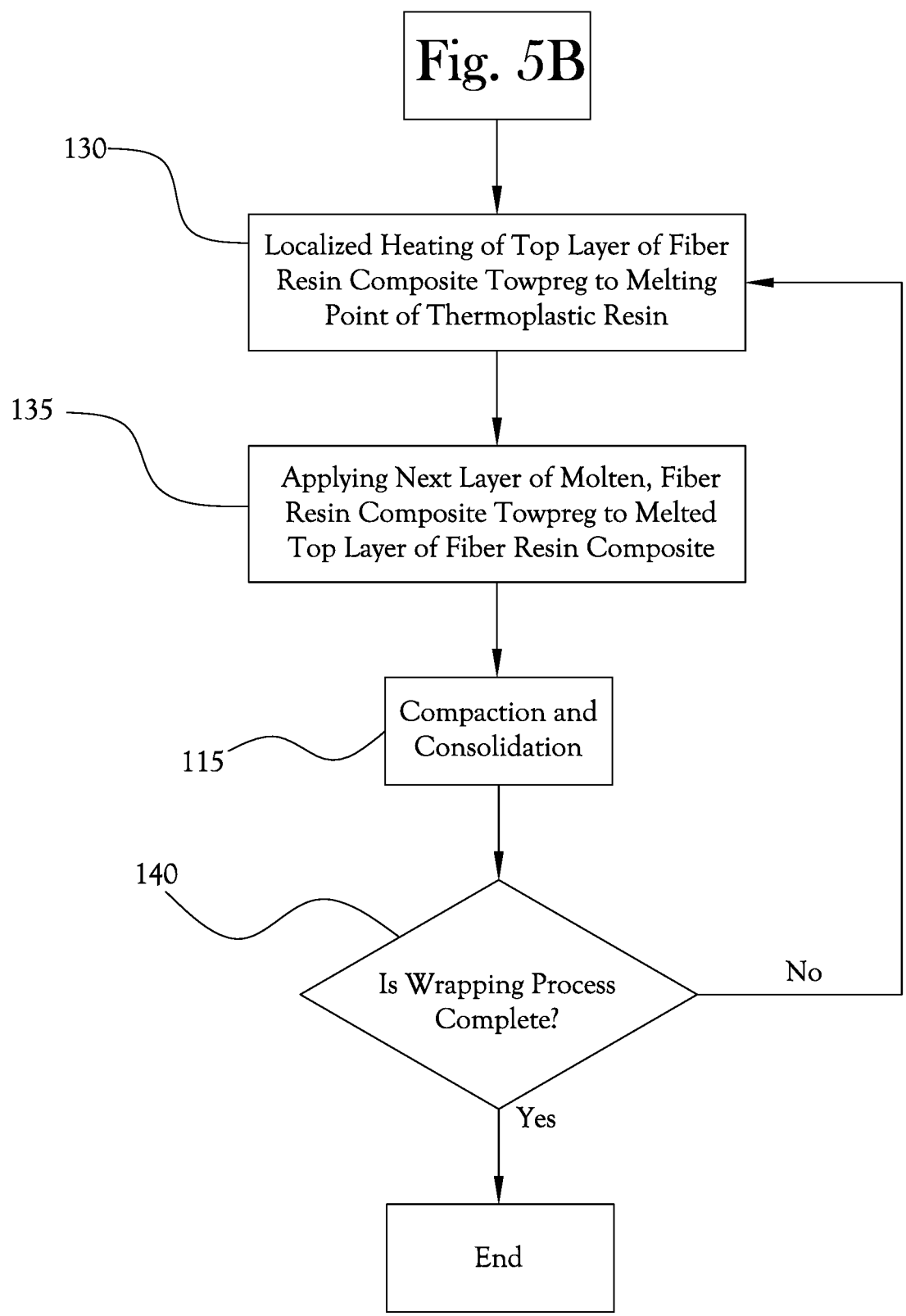

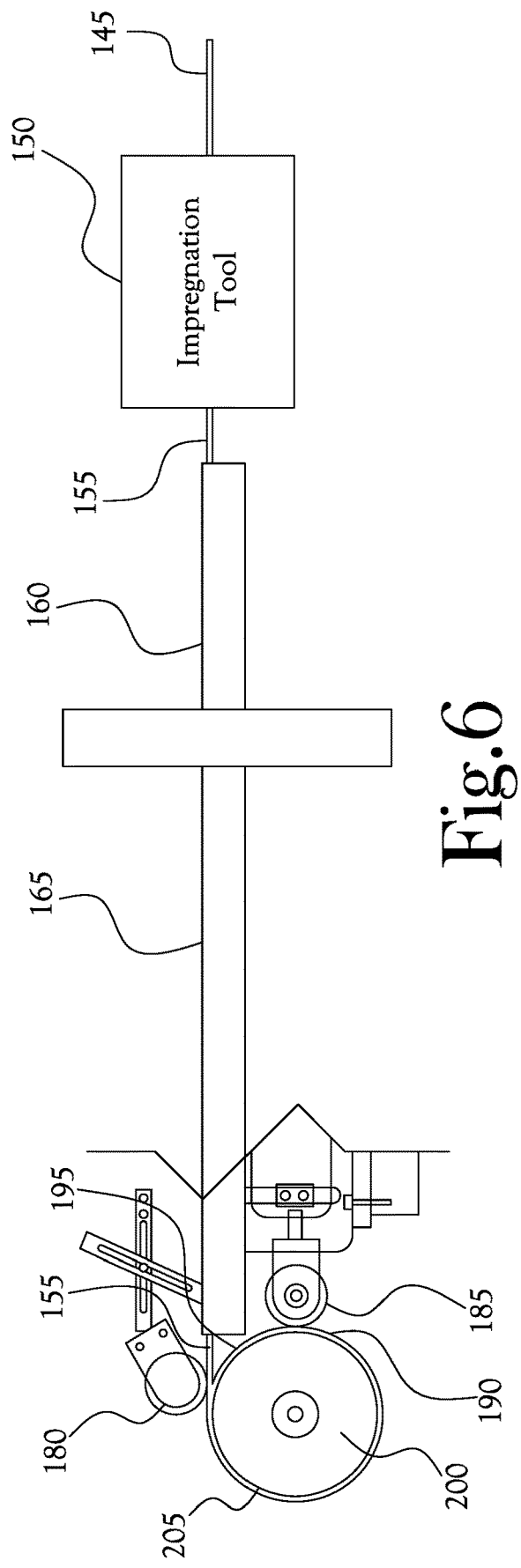

THERMOPLASTIC COMPOSITE IN-SITU MELT PROCESSING METHOD FOR COMPOSITE OVERWRAPPED TOOLS

CROSS-REFERENCE TO RELATED APPLICATIONS

This application claims the benefit of U.S. Non-Provisional patent application Ser. No. 15/340,005, filed on Nov. 1, 2016, which claimed the benefit of U.S. Provisional Patent Application No. 62/249,467, filed on Nov. 2, 2015, each of which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

The invention relates to a method of overwrapping a fiber resin composite over a tool that allows the optimized placement of individual filaments of a fiber tow at the appropriate location such as overwrapping a fiber matrix lamina over a tool. More particularly, it relates to an in-situ melt process, (from dry fiber to molten lamina application), of combining a fiber and a resin and applying the molten fiber resin combination onto a tool in one continuous operation in a manner that more efficiently uses each individual filament to obtain optimized performance of the structure.

2. Description of the Related Art

In the field of carbon fiber and resin composites, due to the higher strength to weight ratio of carbon fiber over steel, numerous tools and structural components, such as concrete pilings, aircraft wings and fuselages, automotive applications, and sporting goods are increasingly substituting carbon fiber and resin composites for steel. Composite Overwrapped Pressure Vessels, ("COPV"), are among the structures that make use of carbon fiber composite technology. And, it is known that there are a number of COPV designs in the market today. In this regard, Type II pressure vessels utilize hoop wraps of fiber over a metallic, usually steel, liner. Type III pressure vessels utilize both hoops and helical wraps of fiber over a metallic liner, usually aluminum. Type IV pressure vessels utilize hoops and helical wraps over a plastic liner. And, Type V pressure vessels utilize hoop and helical fiber wraps over a liner-less tool that may incorporate a barrier film to prevent gas permeation. While the present invention has utility within these types of pressure vessels, as described herein, it also has utility in other types of tools that utilize a composite overwrap. The majority of these designs use a traditional wet winding process with carbon fiber and thermosetting resin. And, it is well known that the current materials and processes used to manufacture tanks today are costly and laborious.

The world-wide demand for fiber, including carbon fiber, for COPVs is growing. Fiber is used for tanks for CNG vehicles, pipelines, storage, and transportation for gases, including without limitation, CNG, Hydrogen, Nitrogen and other gases. Those skilled in the art expect this demand to continue to grow, driven mostly by the class 8 truck market, especially in the event that oil prices begin to rise again and the refueling infrastructure expands and matures.

As stated above, the main cost drivers for COPVs are material, manufacturing time, ultimate performances, and coefficient of performance variances. The current COPV manufacturing process results in a long process cycle for tank manufacturing and consists of the following steps: one of several known methods of forming a fiber/resin complex is selected; the fiber/resin complex is wound onto the pressure vessel body; the pressure vessel body is rotated until B-stage is achieved; the wound cylinder is cured at an elevated temperature in an oven; and the cylinder is cleaned and packaged.

If COPVs are to be widely adopted into the high-volume markets, such as the transportation market, a higher speed, lower cost, manufacturing process (elimination of equipment and process steps), increase in ultimate performances, and decrease in the coefficient of performance variances is necessary.

Carbon fiber is typically delivered as single individual fiber filaments bundled up into a tow. Moreover, a tow may comprise as few as a thousand or as many as twenty-four thousand, or more, individual micron size carbon filaments. Depending upon the bandwidth of the tow as the fiber is being wrapped around a workpiece, the tow may be several hundred fibers thick. As used herein, the term "bandwidth" refers to the total spread width of a fiber tow. And, it is known that it is desirable and critical to maintain the individual filaments within a tow at a consistent tension/length both from side to side and from top to bottom as the tow is wound around a workpiece such as a pressure vessel. In this regard, it is known that if each individual filament is fixed in relation to each other, as when a rigid construction (plastic tape and towpreg) is wound around a radius, it is difficult to maintain consistent individual filament tension. Stated another way, as fiber in a towpreg that has been pre-impregnated with matrix resin and cooled in a straight, or potentially a curved position, is then wrapped around a curved surface, the top filaments, i.e. the filaments on the exterior of the radius, are in tension and bottom filaments, i.e. the filaments along the interior of the radius, are compressed. This does not allow the individual filaments to slide relative to one another causing a phenomenon of catenary, which results in the compression layers of the towpreg embedding into the composite as wavy, wrinkled, or creased fiber, which decreases the overall performance of the structure. This is because every individual filament does not contribute uniformly to the overall composite performances.

When a composite structure, such as a COPV, is manufactured in this manner, the individual filaments are locked into a certain position. That is, some individual filaments are subjected to the structural load while others are not being utilized. In this regard, and referring to FIGS. 1-3, a wrapped vessel is illustrated schematically as vessel 300. Vessel 300, in this example, has a first, or inner, wrapped layer 310 and a second, or outer, wrapped layer 320. It will be understood that FIGS. 1-3 are not drawn to scale. Within layer 310 there is an outer region 312 in tension and an inner region 315 in compression. Similarly, within layer 320, there is an outer region 322 in tension and an inner region 325 in compression. At the initial winding and at neutral pressure, P0 in FIG. 1, the filaments in the tension regions 312 and 322 are fully aligned and are fully engaged while the filaments in the compression regions 315 and 325 are wavy, wrinkled, or creased. As pressure is added to the vessel, (pressure being indicated by arrows 350), designated P1 in FIG. 2, it will be recognized that the vessel undergoes a slight dimensional diameter change. As a result, the filaments in the tension regions 312 and 322 are still fully aligned with fibers fully contributing to composite strength. However, the filaments in the compression regions 315 and 325, are wavy and/or creased and are not fully contributing to composite strength. Finally, as greater pressure is exerted on the vessel 300, P2 in FIG. 3, with additional diameter change, the fully aligned filaments in the tension regions are now at their ultimate strain/stress capability while the fibers in the compression regions are still not fully contributing to fully optimized composite strength such that all of the pressure load has transferred to the filaments in the tension regions. The result is premature failure as the well-aligned filaments in the tension regions fracture first. The majority of the load is then transferred immediately to the non-fully aligned filaments in the compression regions which immediately fracture as well. Lack of uniformly distributed filament alignment causes several things to occur, such as non-uniform increase in dimensional changes, variability in performances, and ultimate fiber performances are not achieved resulting in premature failure. This premature failure results in increased deformation and increased diameter of the vessel 300. Ultimate composite performance is not achieved because the full potential of all of the filaments is not achieved such that the full potential of the filament modulus is not utilized. This problem is compounded with workpieces that have a complex geometric shape.

While various known wet winding processes alleviate some of these problems to some extent because the individual filaments are allowed to slide relative to each other, known wet winding processes suffer from other disadvantages including the necessity of using a low viscosity resins, prolonged curing times, and non-uniform bandwidth shape and size. Further, with known thermoplastic resin systems, a hot molten tape layer is applied to a cool solidified thermoplastic structure. Hence, one layer does not fully adhere to the previous layer, sometimes referred as a cold flow front. This results in low interlaminar shear strength and, ultimately, will prevent the composite from acting as one continuous composite structure leading to premature failure of the vessel.

What is missing from the art is an in-situ melt process of combining a carbon fiber with a thermoplastic and applying the molten composite to a work piece in a manner that allows most if not all of the filaments in the wound composite to determine full composite stiffness (modulus potential) and contribute to full composite strength performances. What is further missing from the art is an in-situ process that applies the molten thermoplastic composite to a portion of a tool that has been heated to the melting point of the thermoplastic composite in such a manner that as successive layers of molten thermoplastic are applied an area of previously applied thermoplastic resin is heated to the melting point such that there is improved adhesion between successive layers, thereby effectively eliminating catenary, wrinkles and creases with the thermoplastic composite overwrap. Also, where successive layers have improved adhesion to one another, interlaminar shear strength is increased. Accordingly, one of the objects of the present invention is to create a method that reduces the overall cost of a COPV through the development of a thermoplastic design and a unique manufacturing process. A further object of the present invention is develop a thermoplastic system consisting of a unique rapid filament winding manufacturing process to produce composite structures. Still another object of the present invention is to use a selected fiber with a thermoplastic resin system using an in-situ process (combine both fiber and thermoplastic resin at the filament winding machine delivery head, an automatic tape laying head, or a tow laying system). Such an in-situ process, (combination of a thermoplastic film and carbon fiber at or near the delivery head to allow molten composite be applied to the tool surface), would reduce production time and cost. It will be recognized that reference to a "delivery head" is inclusive of filament winding machines, automatic tape laying systems, tow laying systems, and other systems, presently known or to be developed, for applying a molten thermoplastic composite to a tool.

BRIEF SUMMARY OF THE INVENTION

The present invention is directed towards a method of creating a fiber resin composite overwrap for various workpieces that are known to be amenable to the composite overwrap process. While the present invention has utility in many types of applications that use composite overwrap, a primary usage is in the preparation of Type II, Type III, Type IV and Type V pressure vessels, referred to herein as composite overwrapped pressure vessels, or COPV's. Type III COPV's tend to be modulus driven applications while Type IV COPV's tend to be strength driven applications. Those skilled in the art recognize that strength driven applications call for fibers having different properties than fibers selected for modulus driven applications. The various physical attributes of various fibers are within the scope and spirit of the present invention. Carbon fiber, or other types of fiber, are combined with a compatible thermoplastic resin system. The selected fiber, whether carbon, glass, aramid, natural fiber, nano-fiber, or other known fibers are prepared for impregnation by a thermoplastic resin. The selected thermoplastic resin, whether in a pellet, tape, or thread configuration, is also prepared for processing.

The carbon fiber and reduced viscosity, i.e. melted, thermoplastic resin, are combined at the filament winding machine delivery head, under pressure, thereby forcing the resin into the fiber bundle. The molten fiber resin lamina is maintained until it is applied to a localized heated portion of the surface of a workpiece, such as a pressure vessel.

The portion of the surface of the workpiece that is to be wrapped is heated to the melting point of the thermoplastic resin so that the molten composite more efficiently adheres to the heated surface of the workpiece. Further, as additional layers of molten thermoplastic composite are wrapped, at least the portion of previously wrapped thermoplastic resin composite is reheated and remelted such that the layers of composite remain molten during the over-wrapping process resulting in better adherence of the layers to one another. The molten layers are then compacted and consolidated under pressure forcing the two distinct resin layers to mix and mingle (allowing polymer chains to cross the boundary) which provides a uniform homogeneous structure. This compaction process removes entrapped air and consolidates the various layers of overwrapped fiber resin composite. Use of an in-situ melt process increases composite performance in that catenary, creases, and wrinkles are diminished or eliminated. This is because the individual filaments throughout the thickness of the molten fiber resin composite towpreg bandwidth are allowed to slide across each other during the wrapping process thereby allowing for uniform tension within the fiber bundle of the fiber resin composite.

BRIEF DESCRIPTION OF THE SEVERAL VIEWS OF THE DRAWINGS

The above-mentioned features of the invention will become more clearly understood from the following detailed description of the invention read together with the drawings in which:

FIGS. 1-3 are schematic views of prior art wrapped pressure vessels schematically depicting differing pressures being exerted on said vessels;

FIGS. 5A, 5B and 5C depict a flow-chart of the steps of the present invention;

FIG. 6 is a schematic view of an exemplary embodiment of the invention; and

DETAILED DESCRIPTION OF THE INVENTION

The present invention is directed towards a method of creating a carbon fiber overwrap, such as is used for pressure vessels. Those skilled in the art will recognize that other types of items, referred to herein generally as workpieces, are often overwrapped with a fiber resin composite. The present invention is further directed towards using an in-situ process for combining both the fiber and thermoplastic resin at the filament winding machine delivery head, the delivery head of an automatic tape laying system, or the delivery head of a fiber resin composite towpreg laying system, and applying the molten fiber thermoplastic resin complex to a heated workpiece, such as, but not limited to a pressure vessel. As used herein, the term "in-situ process" refers to a continuous process, from impregnation of the dry fiber to the final application, for allowing optimized filament placement. The in-situ process of the present invention allows the individual filaments to slip, slide, or shear relative to one another, from before the impregnation process until final placement onto a tool/composite structure whereby any change in length from side to side and/or from top to bottom, each and every individual filament dimension is translated all the way back to the original dry fiber.

Raw Materials

Those skilled in the art will readily recognize that the primary raw materials in a carbon fiber resin composite include the resin 10 and the carbon fiber 20. The discussion to follow will address these components in greater detail and their relationship to one another is seen both in FIGS. 4A-4E which depicts a matrix of choices at each processing step and in FIGS. 5A, 5B and 5C which depict a flow-chart of the steps of the present invention.

Carbon Fiber

Figure 3:
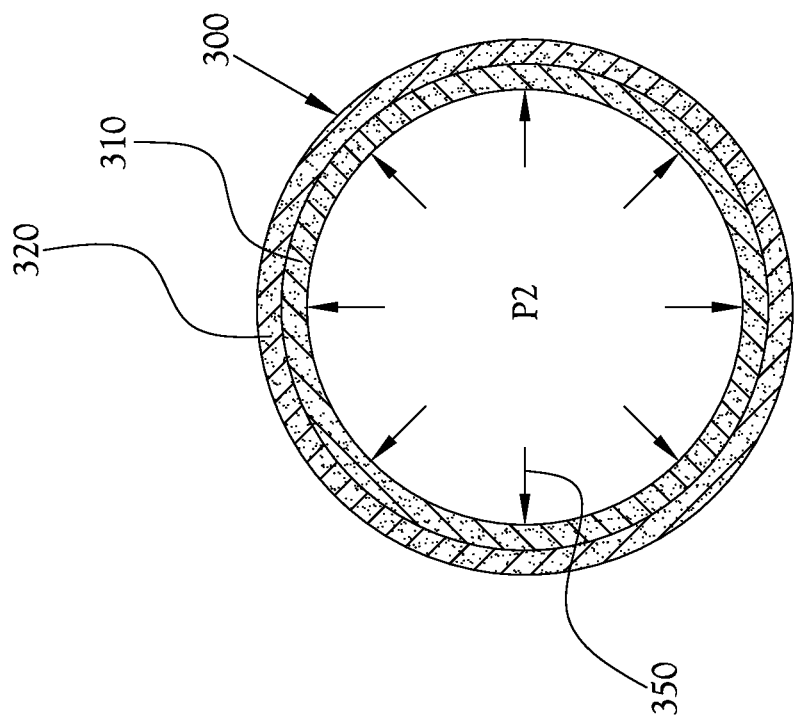
Figure 1:
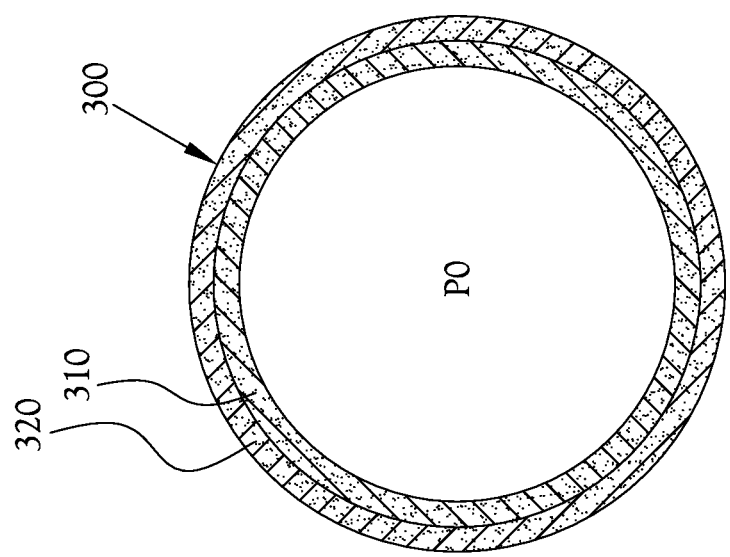
Figure 4A:
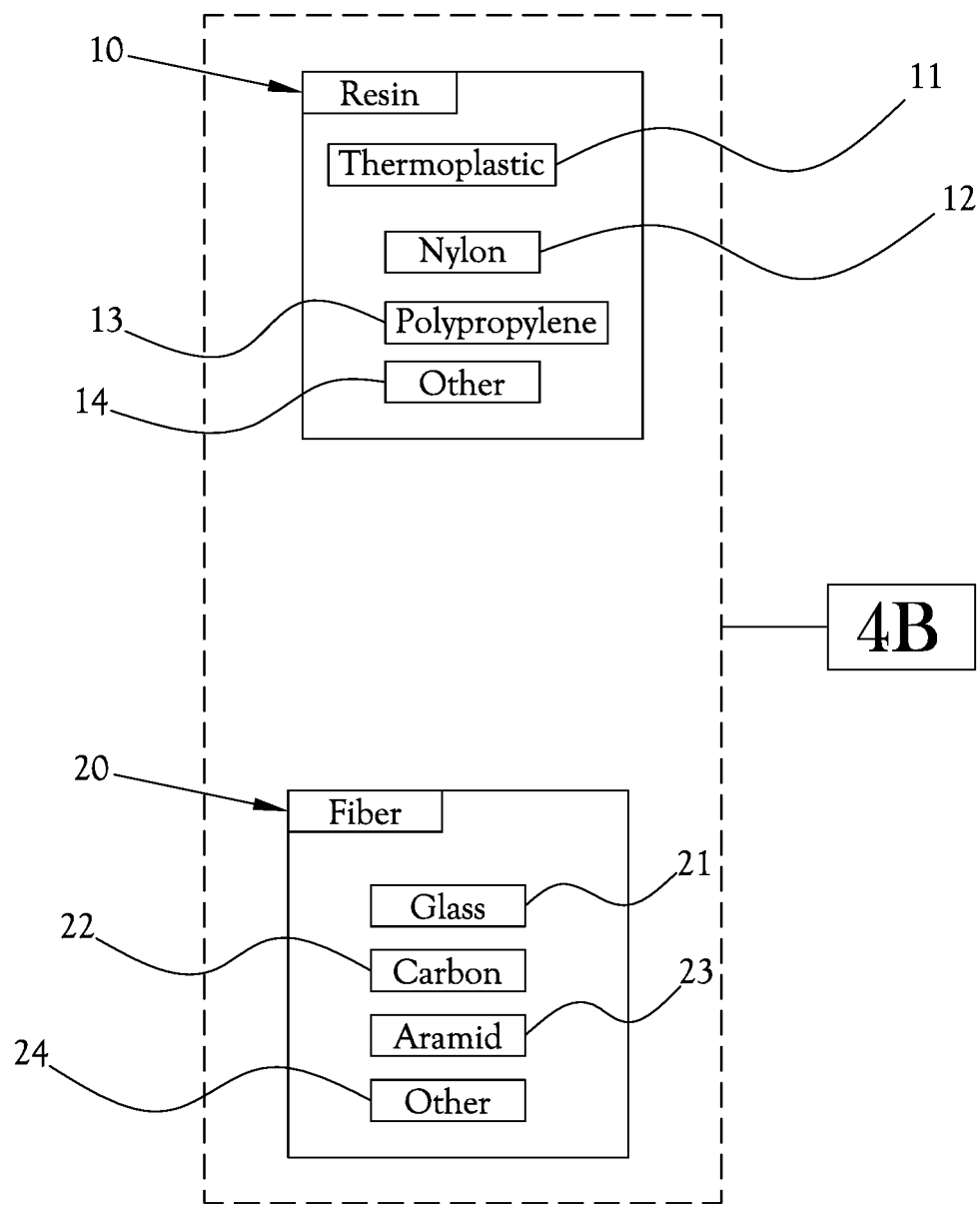
FIGS. 4A-4E depict the matrix of choices available at each processing step in the method of the present invention.

Referring to FIG. 4A and the step 20 of selecting a fiber, it will be recognized that there are a number of commercially available fibers that are used with composite overwrapped applications. In this regard, carbon fibers 22 are typically chosen for Type IV COPV's that are typically used with compressed natural gas, ("CNG"), due to their strength. Type IV COPV's used with CNG are a strength driven application for composite overwrapping due to the fact that the plastic liner does not fatigue. Other applications may call for use of glass fiber 21, natural fiber, nano-fiber, or aramid fibers 23. And, those skilled in the art will recognize that there are other 24 known types of fibers that are compatible with thermoplastic resin systems. Type III COPV's used for CNG are modulus driven applications because of the known tendency of aluminum liners to fatigue. Those skilled in the art recognize that strength driven applications call for fibers having different properties than fibers selected for modulus driven applications. The various physical attributes of various fibers are within the scope and spirit of the present invention.

It is known in the art that various commercially available fibers consist of sizing, which is not compatible with thermoplastic resin systems. Those skilled in the art recognize that sizing is a protective film used to protect the individual fiber filament and allow subsequent handling of the fibers; and that sizing promotes the adhesion between the fiber and matrix. Accordingly, in an exemplary embodiment, a fiber having sizing chemistries compatible with thermoplastic resins, such as polypropylene and nylon resins is selected. In an exemplary embodiment, the sizing is applied to the fiber during the carbon fiber manufacturing process, not after. Additionally, due to the known tendency of some fibers and some sizing chemistries to absorb moisture, any latent moisture must be removed by drying. Otherwise the moisture may be expelled during the process of combining the fiber and the resin resulting in porosity within the structure. This porosity results in poor product performance quality. In an exemplary embodiment, the fiber can be dried in oven dryers or infrared dryers. Those skilled in the art will recognize that there are other known methods of drying fiber.

Resin

Referring to FIG. 4A and the step 10 of selecting a resin, and in accordance with the present invention, thermoplastic resins, as opposed to epoxy resins, are preferred. There are many commercially available thermoplastic resins 11, including nylon resins 12, polypropylene resins 13, polyethylene resins, and polyetheretherketone, ("PEEK"), resin systems. Those skilled in the art will recognize that there are other 14 commercially known thermoplastic resin systems that could easily be adapted to the in-situ process of the present invention. For Type IV pressure vessels the use of a low temperature thermoplastic is required due to the plastic liner that is being used. In an exemplary embodiment, polypropylene resin is utilized with plastic liner Type IV pressure vessels. In a further exemplary embodiment, for Type III pressure vessels, a higher temp resin system, such as a nylon resin system is selected.

Figure 4B:
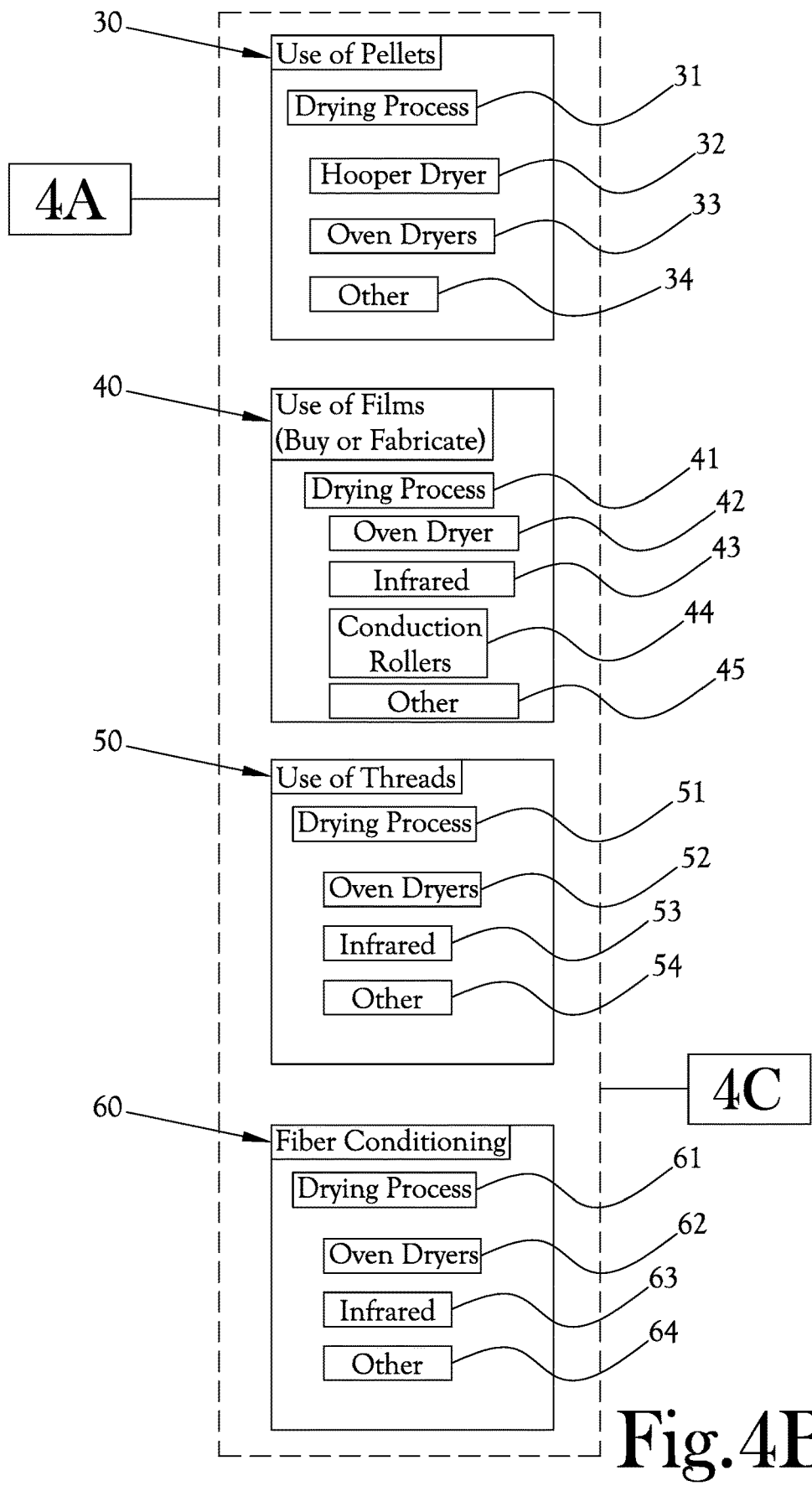

Referring to FIG. 4B, just as thermoplastic resins are available in a variety of different chemistries, these resins are available in a variety of physical forms. Thermoplastic resins are available as pellets 30, films 40, and threads 50. While each of these can be adapted to be used in the present in-situ melt process, it is more economical to utilize a resin in a pellet form. As described above with fiber, it is important that any absorbed moisture be driven off by drying process 31. In this regard, Hooper dryers 32, oven dryers 33, and/or other drying systems 34, such as conduction rollers, and infrared dryers can be utilized to dry the thermoplastic resin. Moisture can also be removed, as will be recognized by those skilled in the art, by the use of oven dryer systems. Similarly, as set forth in FIG. 4B, when using films 40 absorbed moisture should be driven off by a drying process 41, which could, within the scope of the present invention, include oven dryers 42, infrared dryers 43, conduction rollers 44, or other 45 drying methods. Still referring to FIG. 4B, when using thread resins 50, absorbed moisture should be driven off by a drying process 51, which could, within the scope of the present invention, include oven dryers 52, infrared dryers 53, other 54 drying methods. Further, as seen in FIG. 4B, when using fiber resins 60, absorbed moisture should be driven off by a drying process 61, which could, within the scope of the present invention, include oven dryers 62, infrared dryers 63, other 64 drying methods.

Material Preparation

Figure 4C:
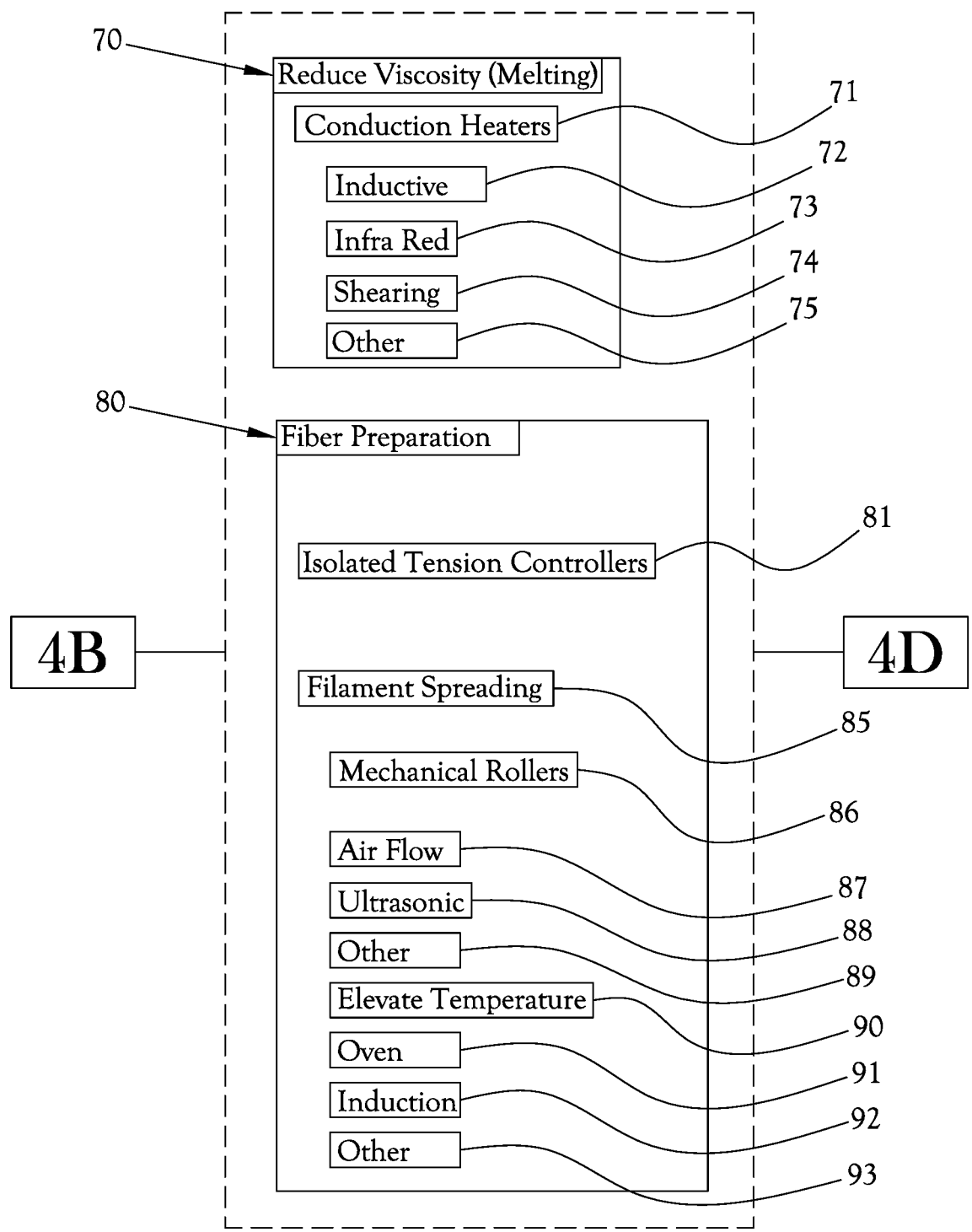
Figure 4D:
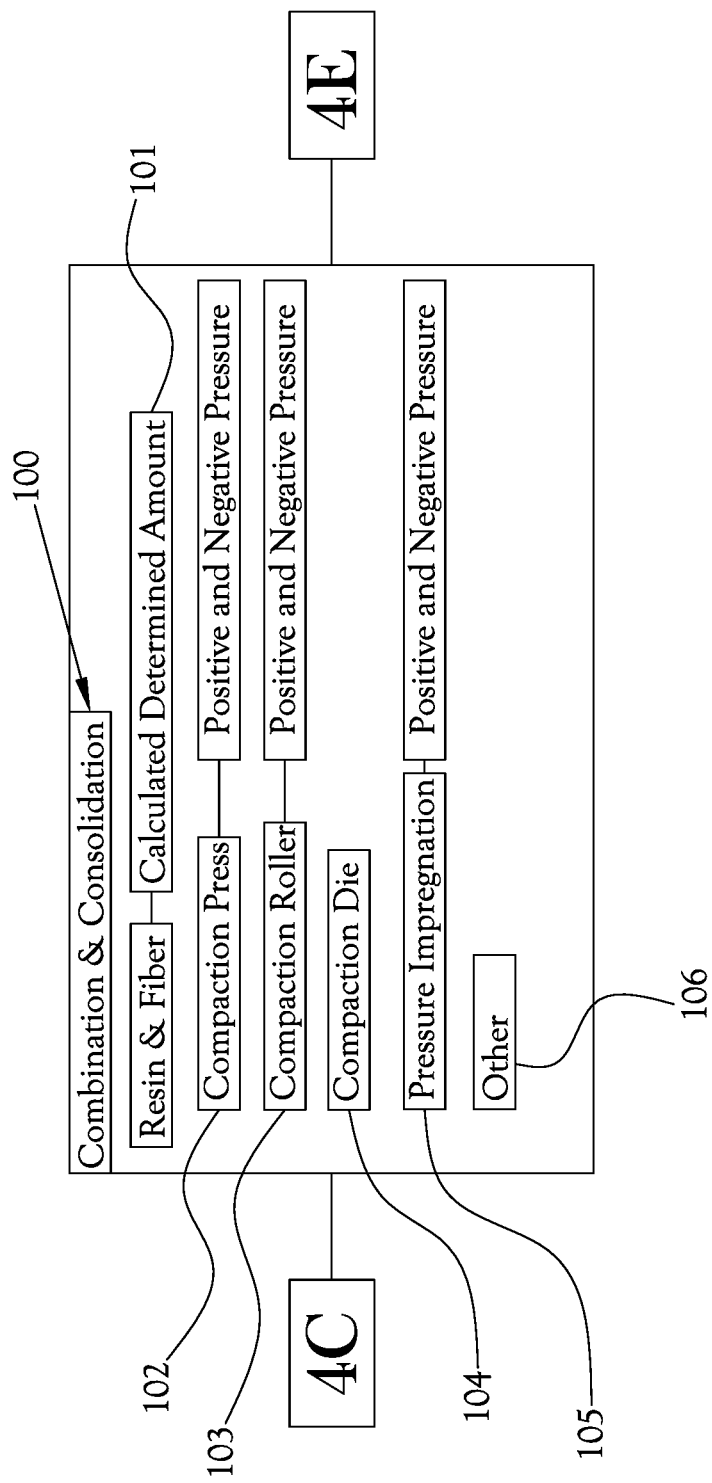
Figure 4E:
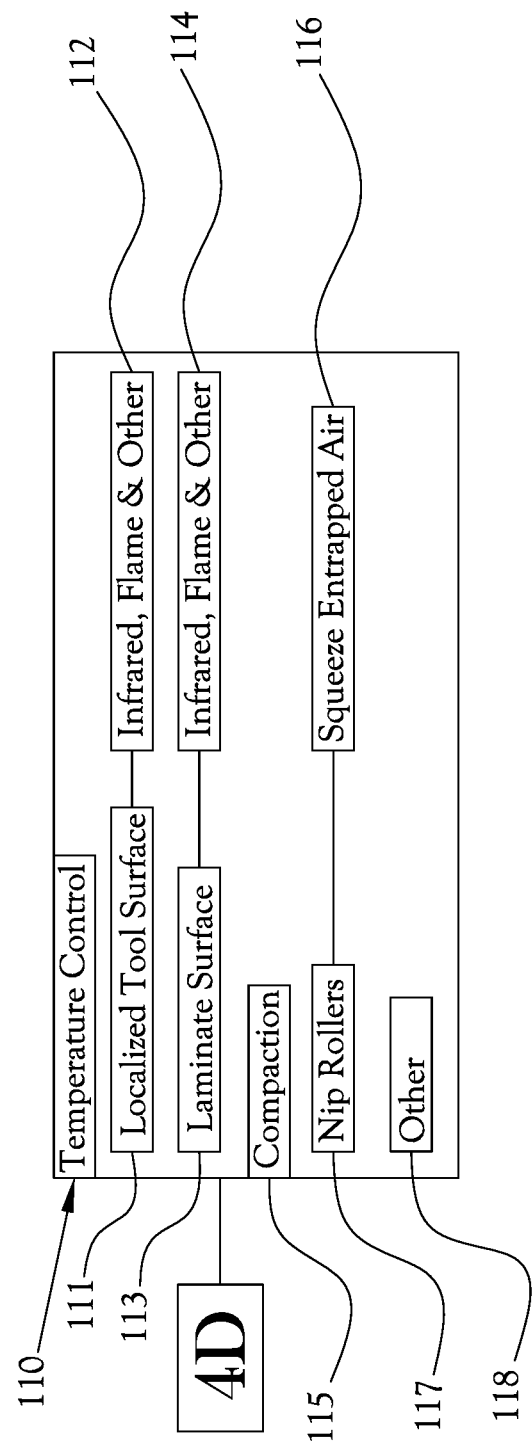

Referring to FIG. 4C, subsequent to drying the thermoplastic resin, it is necessary to significantly reduce the viscosity 70 of the resin material. The resin's minimum viscosity is reduced under pressure, at a selected temperature over a selected period of time. In this regard, time, temperature, and pressure are inter-dependent variables in the process of reducing the resin to its minimum viscosity. In an exemplary embodiment, shearing arbors 74 are used to decrease the viscosity of the resin by increasing friction, pressure, and time. Heat is applied by use of conduction heaters 71, induction heaters, infrared heaters 73, or other 75 presently known, or subsequently discovered methods of heating a thermoplastic resin in order to reduce its viscosity. It will be understood that the desired temperature is dependent, first, on the resin chemistry selected. Once the viscosity is reduced to a desired level, the melted resin is combined with the fibers, which have been further prepared as will be described below, under pressure in order to assure that the melted resin completely infiltrates the fiber tow.

Prior to being infiltrated by the melted resin, the fiber must be prepared 80. In order to provide optimum performance, the load-bearing fiber must be uniformly and equally spread to the desired bandwidth. Further, during the spreading process and during the infiltration step, care must be taken to ensure that every individual filament within the carbon fiber tow is under the same tension. This critical step also allows easy resin infiltration into and around the individual filaments. In an exemplary embodiment, upstream tension and downstream tension are isolated from one another 81. Tension up-stream of the impregnation area is kept at a minimum, to prevent fiber damage. Pressure is also kept at a minimum during the impregnation process to allow easy infiltration of resin. However, after the impregnation process, pressure is increased to improve individual filament alignment and uniformity. The raw fiber tow is also spread 85 to the desired bandwidth 83 and tension. Mechanical rollers 86, air flow 87, ultrasonic devices 88, and other devices 89, such as combs, are known devices for spreading the raw fiber tow to the desired bandwidth and maintaining tension on the fiber tow such that all fibers in the fiber tow are under the same tension.

After the individual filaments of the fiber tow are uniformly and precisely spread 85 to the desired bandwidth, the fiber tow must be heated 90 to the same, or in some instances higher, temperature as the molten resin in order to assure adequate and complete impregnation. Those skilled in the art will recognize that the fiber tow can be heated by use of an oven 91, an induction furnace 92, or through the use of other methods 93, such as conduction rollers.

Material Combination—Resin Impregnation of Fiber

As described above, after the fiber tow is prepared, i.e. dried, spread to the desired bandwidth, and heated, and the resin is at its minimum viscosity, the fiber tow is impregnated, i.e. combined and consolidated 100, with the molten resin in a selected, determined amount 101, under pressure in an exemplary embodiment. Impregnation under pressure, either positive pressure or negative pressure, can be accomplished by a compaction press 102, a compaction roller 103, a compaction die 104, by pressure impregnation 105, or by other methods 106. In an exemplary embodiment, this step is accomplished immediately prior to application of the molten composite to a heated area of a workpiece such as pressure vessel. In this regard, in the in-situ process of the present invention, the fiber tow is impregnated with molten resin at, or in very close proximity to the filament winding head.

Material Application—Carbon Fiber In-Situ Process

Once the fiber and resin are combined, under pressure, to form a molten fiber resin composite towpreg, the molten fiber resin composite towpreg is kept at a constant bandwidth, tension, and temperature 110. As discussed above, tension is controlled, and upstream tension is isolated from downstream tension 81. Bandwidth and temperature are controlled as discussed above. The location 111 where the molten fiber resin composite towpreg will be laid down is brought to and kept at a temperature that is approximately the same as the melting point of the thermoplastic resin system in order to allow adhesion of one layer to another, previously wrapped layer. A heat source 112, such as an infrared source, induction coils, conduction rollers, flames, infrared heaters, by way of example and not limitation, is utilized. This allows each individual filament to slide one relative to another thereby allowing each individual filament to be at the relative same tension during application of the molten fiber resin composite towpreg. Further, maintaining a molten state as the layers are laid down 113 allows entrapped air to escape. A heat source 114, such as an infrared source, induction coils, conduction rollers, flames, infrared heaters, by way of example and not limitation, is utilized to heat the pressure vessel or other tool being overwrapped. An external compaction force 115 is utilized to compact and consolidate the molten fiber resin composite towpreg to the pressure vessel, or other tool being overwrapped. This compaction process removes entrapped air 116 and consolidates the various layers of overwrapped fiber resin composite. A compaction roller, nip roller 117, or similar device 118, is utilized for this compaction process.

It will be understood by those skilled in the art, that the entire pressure vessel could be brought up to temperature, or, in an exemplary embodiment, the heating could be isolated, or localized, to the portion of the tool surface undergoing the overwrap process. Further, with small vessels or tools, the temperature is maintained at the melting point of the thermoplastic resin as successive laminations 113 of fiber resin composite are laid down.

Figure 5B:
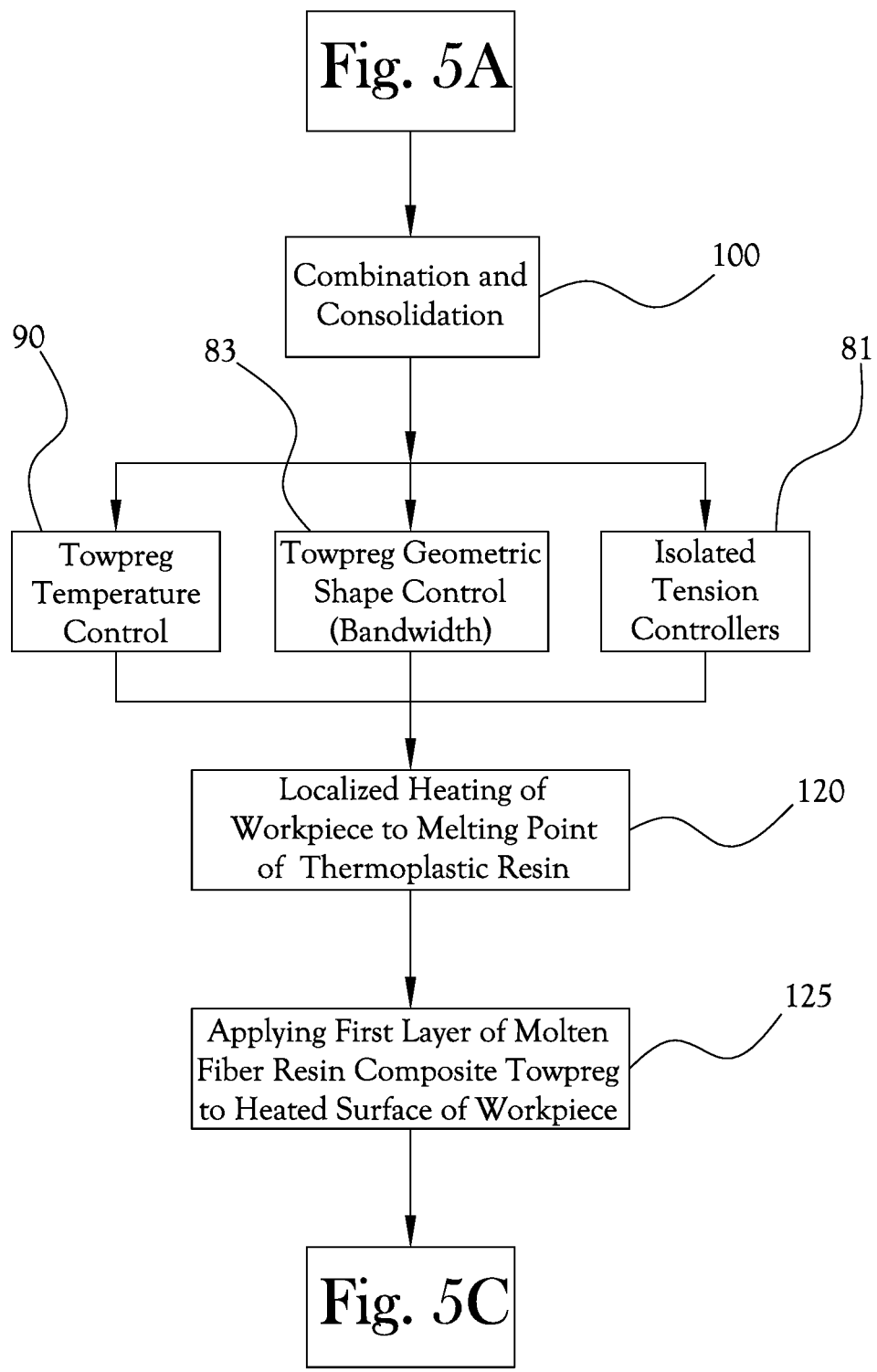

In an exemplary embodiment, and referring to FIGS. 5A and 5B, resin is selected 10 and the fiber is selected 20. In an exemplary embodiment, the selected fiber is a carbon fiber. After the fiber is conditioned 60 and prepared 80, and after the viscosity of the selected resin is reduced 70, the carbon fiber and the thermoplastic resin are combined 100 at the filament winding machine to produce a thermoplastic composite that is then delivered to a workpiece, such as a pressure vessel, while still molten. Those skilled in the art will recognize that other composite manufacturing equipment, such as automatic tape laying systems and other tow laying systems could be utilized with the process of the present invention. To achieve this objective, as stated above, the fiber and resin are heated and combined 100 under pressure in order to impregnate the carbon fiber with molten thermoplastic resin. Then while it is molten, the molten composite matrix is applied to the surface of the tool, (pressure vessel liner, shaft or other structure), which has also been heated to the melting point of the thermoplastic resin. In this regard, in an exemplary embodiment, a heating system, such as a flame or heated conduction roller system, is utilized to heat at least the portion of the surface of the tool to which the molten fiber resin composite towpreg is to be applied/wrapped. Those skilled in the art will recognize that other heat sources could be utilized. Carbon fibers quickly absorb this heat (Induction heat) and will automatically transfer this heat to the thermoplastic resin.

The molten fiber resin composite lamina could then be compressed, by means of compaction rollers 180, 185, dies, or other devices into tape form of the desired bandwidth. This hot composite, i.e. molten fiber resin composite towpreg, which in one embodiment could take the form of a molten fiber resin tape, is then applied to a hot tool surface. By maintaining at least a selected portion of the working surface of the workpiece 200 at an elevated temperature 111 that approximates the melting point of the thermoplastic resin and by compacting successive molten lamina under pressure, successive layers adhere to one another and fuse thereby eliminating, or substantially eliminating cold flow lines, sometimes referred to as knit lines. Thus, in the in-situ melt process of the present invention, at least a selected area of the workpiece, tool or composite is heated prior to consolidation through the use of another heat source, which can be gas, inductive, infrared, or other known heat sources.

In an exemplary embodiment, immediately prior to the step of wrapping, or applying, the first layer of molten fiber resin composite towpreg to a workpiece 200, at least a selected portion of the workpiece 200 is heated 120 to the melting point of the molten fiber resin composite towpreg such that the molten state of the molten fiber resin composite towpreg is maintained during the wrapping process. The first layer of molten fiber resin composite towpreg is applied to the heated surface of the workpiece 125. Applying the molten fiber resin composite towpreg to the heated surface of the workpiece enhances adhesion and also allows the layers of fiber within the molten fiber resin composite towpreg to slide relative to one another maintaining uniform tension and substantially eliminating catenary and wrinkling.

Thereafter, as additional layers of molten fiber resin composite towpreg are applied, at least a selected portion of the outermost layer of the wrapped workpiece is heated 130 such that the previously applied, outermost layer of the fiber resin composite towpreg is melted prior to applying, or over-wrapping, an additional layer of molten fiber resin composite towpreg. A subsequent, or next, layer of molten fiber composite towpreg is then wrapped over the melted substrate layer 135. Melting the substrate layer, i.e. the previously wrapped layer of fiber resin composite towpreg prior to applying the next layer of molten fiber resin composite towpreg results in applying molten fiber resin composite towpreg to a molten substrate. This results in better adherence of successive molten composite layers to one another and further allows individual filaments within said molten fiber resin composite towpreg to slide relative to one another, again, thereby effectively eliminating catenary, wrinkles, and creases within the fiber resin composite overwrap. Further, as the molten fiber resin composite towpreg is applied to the molten substrate fiber composite, the successive layers are compacted and consolidated 115 under pressure thereby removing entrapped air. This process continues 140 until the process is complete.

Figure 7:
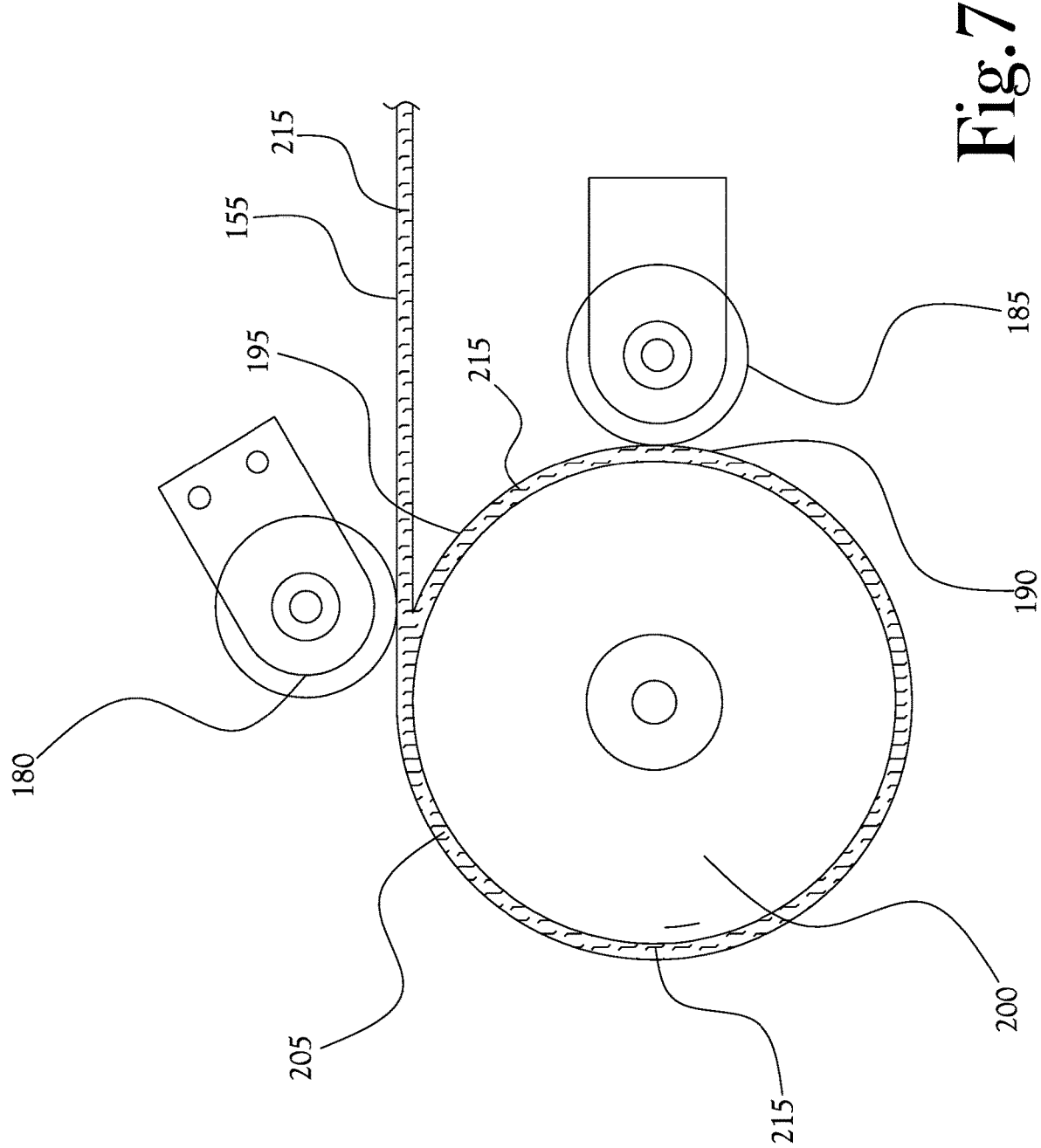
FIG. 7 is an enlarged schematic view of a portion of FIG. 6 illustrating the mixing of the molten and compacted layers of resin fiber composite.

This process is also represented schematically in FIGS. 6 and 7 in which the selected, and prepared fiber bundle/tow 145 is impregnated with molten resin at the impregnation tool 150. Fiber bundle/tow 145 is comprised of potentially thousands of individual filaments that act independently of each other. That is, each individual filament has the ability to slide, slip or shear relative to one another. These individual filaments depending on their length determine the overall performances of a composite structure. When some of these individual filaments are longer, they initially will not contribute to the mechanical performance of the composite structure.

In this regard, impregnation tool 150 introduces a matrix/resin into the fiber bundle/tow 145. In this particular embodiment, it introduces a molten resin system into the fiber bundle/tow 145. To assure proper performance, each individual filament is coated with this resin system. In this molten state the individual filaments have the ability to slide, slip or shear relative to one another. In the in-situ process of the present invention, the fiber tow is impregnated with molten resin at, or in very close proximity to the filament winding head. Further, once the fiber and resin are combined, under pressure, to form a molten fiber resin composite towpreg 155, the molten fiber resin composite towpreg is kept at a constant bandwidth and tension and the temperature is maintained at the melting point. As discussed above, tension is controlled and upstream tension 160 is isolated from downstream tension 165. Bandwidth and temperature are controlled as discussed above. Once the molten lamina formed by fiber resin composite towpreg 155 leaves the impregnation tool 150, it remains molten. Any path that this molten lamina takes over any heated structure or any other heated support tool allows the individual filaments to slide, slip or shear relative to one another. Any individual filament movement (slide, slip or shear) is transferred and related back to the original fiber bundle 145. For filaments that have low elongation properties this is particularly true.

As the molten lamina fiber resin composite towpreg 155 enters into heated sections 160 and 165, it is kept in a molten state to allow each individual filament within the tow to slide, slip, and shear relative to one another. In the heated sections 160 and 165, there can be a series of equipment that maintains the molten state. It can be comprised of rollers, heaters (infra-red, convection and or lasers) that maintain this molten state.

As stated above, at least the portion of the workpiece 200 that is to be wrapped is heated 120 to the melting point of the molten fiber resin composite towpreg 155 such that the molten state of the fiber resin composite towpreg is maintained during the wrapping process. In an exemplary embodiment, this is accomplished by a heated compaction roller 185. Heated compaction roller 185 heats the portion of the workpiece 200 to be wrapped, or as the wrapping process continues the portion of the outermost layer of fiber resin composite that is to be over-wrapped to the melting point so that the outermost layer of fiber resin composite and the molten fiber resin composite towpreg are both at the melting point of the fiber resin composite. A second heated compaction roller 180 compacts and consolidates the molten layers under pressure thereby removing entrapped air.

On the localized composite structure 190 the surface on this structure is heated to the molten state by a heating system 185. This composite matrix surface is now translated to position (moved by rotation or other means) 195 where the molten lamina fiber resin composite towpreg 155 is applied to this surface. Both surfaces 195 and 155 are at a molten state. A localized heated compaction system 180 applies temperature and pressures allowing both molten matrixes to mix and adhere to one another. As the molten lamina fiber resin composite towpreg 155 is applied to localized molten surface 195 any change in geometric surface path that changes fiber length, this change in length is transmitted all the way back to the original dry fiber 145. Because the filament lamina fiber resin composite towpreg 155 is molten each individual filament acts independently of one another. Hence each individual filament is allowed to slide slip or shear relative to one another.

At location 205 majority of the individual filaments within this section of the composite structure are straight, uniform, and consistent. That is, each individual filament is at a uniform and consistent tension. When this structure is mechanically loaded a majority of individual filament are contributing to the performance of the composite. Hence, the performance of the structure is consistent and uniform.

At location 205 the matrix resin system throughout the thickness of the structure is uniform and consistent. It will be appreciated that during the wrapping process, as the molten lamina fiber resin composite towpreg 155 that has been applied to workpiece 200 passes location 205, fiber resin composite towpreg 155 is allowed to cool below the melting point of the resin. When a molten lamina comprised fiber and matrix/resin is applied to the surface of 195 there exists a distinct easily observable boundary layer. The matrix/resin polymer chain 215 in area 195 and in the molten lamina fiber resin composite towpreg 155 are segregated, polymer chains do not cross this boundary. Once additional heat and compaction 180 is applied during the wrapping process, these boundary layers fade and dissolve as the matrix/resin layers are compacted and are thereby forced to mix. Now across this boundary layer the polymer chains do mingle and strengthen and behave as a uniform structure.

Use of an in-situ melt process also increases composite performance in that catenary, creases, and wrinkles are diminished or eliminated. In this regard, each individual filament within the carbon fiber resin tow prepreg is allowed to be at equal and uniform tension. This is achieved because the resin system in the towpreg is allowed to be molten throughout the process thereby allowing each individual filament within the molten fiber resin composite towpreg to slide relative to one another, thereby achieving full potential of the molten fiber resin composite towpreg's mechanical properties and thereby increasing interlaminar shear strength. This is because the inner and outer layers of carbon fiber within the molten fiber resin composite towpreg composite are allowed to slide across each other allowing for uniform tension within the fiber bundle of the fiber resin composite. Further, it will be recognized that the thermoplastic in-situ melt process described herein can be used in any composite manufacturing equipment. That is it can be used within a fiber placement machine or other equipment such as a pultrusion system and similar machinery.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. An in-situ melt process for creating a fiber resin composite overwrap, said in-situ melt process comprising the steps of:
   selecting a fiber tow consisting of unimpregnated fibers;
   selecting a thermoplastic resin compatible with said selected fiber tow, said selected thermoplastic resin having a melting point;
   preparing said fiber tow for impregnation by said selected thermoplastic resin, wherein said step of preparing said fiber tow for impregnation includes heating said fiber tow to a selected temperature wherein said selected temperature is at least said melting point of said selected thermoplastic resin;
   heating a selected portion of a workpiece to said melting point of said thermoplastic resin;
   reducing viscosity of said thermoplastic resin under pressure by heating said thermoplastic resin to said melting point of said thermoplastic resin;
   impregnating said molten thermoplastic resin into said prepared fiber tow under pressure and in close proximity to a filament winding head, thereby creating a molten fiber resin composite towpreg and immediately applying a first layer of said molten fiber resin composite towpreg to said heated surface of said workpiece whereby a molten state of said molten fiber resin composite towpreg is maintained during a wrapping procedure thereby resulting in said molten fiber resin composite towpreg more efficiently adhering to the heated surface of the workpiece;
   heating a selected portion of said applied layer of said fiber resin composite towpreg to said melting point of said thermoplastic resin whereby said applied layer of said fiber resin composite towpreg is remelted prior to applying an additional layer of said molten fiber resin composite towpreg;
   applying an additional layer of said molten fiber resin composite towpreg to said molten applied layer of fiber resin composite towpreg under pressure whereby applying molten fiber resin composite towpreg to an area of molten fiber resin composite towpreg previously applied to said workpiece allows successive molten fiber resin composite layers to adhere to one another, resulting in greater interlaminar shear strength and further allows individual filaments within said molten towpreg to slide relative to one another, thereby effectively eliminating catenary, wrinkles, and creases within the fiber resin composite overwrap; and
   compacting and consolidating said molten fiber towpreg layers to one another under pressure thereby removing entrapped air;
   whereby said fiber resin composite overwrap is not released from said workpiece.

2. The in-situ melt process for creating the fiber resin composite overwrap of claim 1 wherein said workpiece is a Type II pressure vessel.

3. The in-situ melt process for creating the fiber resin composite overwrap of claim 1 wherein said workpiece is a Type III pressure vessel.

4. The in-situ melt process for creating the fiber resin composite overwrap of claim 1 wherein said workpiece is a Type IV pressure vessel.

5. The in-situ melt process for creating the fiber resin composite overwrap of claim 1 wherein said fiber tow is selected from a group consisting of carbon fiber, glass fiber, natural fiber, nano-fiber, and aramid fiber.

6. The in-situ melt process for creating the fiber resin composite overwrap of claim 1 wherein said thermoplastic resin is selected from a group consisting of nylon resin, polypropylene resin, polyethylene resin, and polyetheretherketone resin.

7. The in-situ melt process for creating the fiber resin composite overwrap of claim 1 wherein said thermoplastic resin is in pellet form.

8. The in-situ melt process for creating the fiber resin composite overwrap of claim 1 wherein said thermoplastic resin is in tape form.

9. The in-situ melt process for creating the fiber resin composite overwrap of claim 1 wherein said thermoplastic resin is in thread form.

10. The in-situ melt process for creating the fiber resin composite overwrap of claim 1 wherein the step of preparing said fiber tow for impregnation by said thermoplastic resin includes the steps of drying said fiber tow, spreading said fiber tow to a selected bandwidth, and heating said fiber tow to a selected temperature, wherein said selected temperature is approximately said melting point of said selected thermoplastic resin.

11. An in-situ melt process for creating a fiber resin composite overwrap, said in-situ melt process comprising the steps of:
selecting a fiber tow consisting of unimpregnated fibers;
selecting a thermoplastic resin compatible with said selected fiber tow, said selected thermoplastic resin having a melting point;
preparing said fiber tow for impregnation by said selected thermoplastic resin, wherein the step of preparing said fiber tow for impregnation by said thermoplastic resin includes the steps of drying said fiber tow, spreading said fiber tow to a selected bandwidth, and heating said fiber tow to a selected temperature, wherein said selected temperature is at least said melting point of said selected thermoplastic resin;
heating a selected portion of a workpiece to said melting point of said thermoplastic resin;
reducing viscosity of said thermoplastic resin under pressure by heating said thermoplastic resin to said melting point of said thermoplastic resin;
impregnating said prepared molten thermoplastic resin into said prepared fiber tow under pressure at a filament winding head, thereby creating a molten fiber resin composite towpreg and immediately applying a first layer of said molten fiber resin composite towpreg to said heated surface of said workpiece whereby a molten state of said molten fiber towpreg is maintained during a wrapping procedure thereby resulting in said molten fiber resin composite towpreg more efficiently adhering to the heated surface of the workpiece;
directly heating a selected portion of said workpiece having an applied layer of said fiber resin composite towpreg to said melting point of said thermoplastic resin whereby said applied layer of said fiber resin composite towpreg is remelted prior to applying an additional layer of molten fiber resin composite towpreg;
applying an additional layer of molten fiber resin composite towpreg to said molten applied layer of fiber resin composite towpreg under pressure whereby applying said molten fiber resin composite towpreg to an area of molten fiber resin composite towpreg previously applied to said workpiece allows successive molten fiber resin composite towpreg layers to adhere to one another and further allows individual filaments within said molten fiber resin composite towpreg to slide relative to one another, thereby effectively eliminating catenary, wrinkles, and creases within the fiber resin composite overwrap; and
compacting and consolidating said molten fiber resin composite towpreg layers to one another with a secondary heating source and under pressure thereby removing entrapped air;
whereby said fiber resin composite overwrap is not released from said workpiece.

12. The in-situ melt process for creating the fiber resin composite overwrap of claim 11 wherein said workpiece is selected from a group consisting of a Type II pressure vessel, a Type III pressure vessel, and a Type IV pressure vessel.

13. The in-situ melt process for creating the fiber resin composite overwrap of claim 11 wherein said fiber tow is selected from a group consisting of carbon fiber, glass fiber, natural fiber, nano-fiber, and aramid fiber.

14. The in-situ melt process for creating the fiber resin composite overwrap of claim 11 wherein said thermoplastic resin is selected from a group consisting of nylon resin, polypropylene resin, polyethylene resin, and polyetheretherketone resin.

15. The in-situ melt process for creating the fiber resin composite overwrap of claim 11 wherein said thermoplastic resin is in pellet form.

16. The in-situ melt process for creating the fiber resin composite overwrap of claim 11 wherein said thermoplastic resin is in tape form.

17. The in-situ melt process for creating the fiber resin composite overwrap of claim 11 wherein said thermoplastic resin is in thread form.

18. An in-situ melt process for creating a fiber resin composite overwrap, said in-situ melt process comprising the steps of:
selecting a fiber tow consisting of unimpregnated fibers;
selecting a thermoplastic resin compatible with said selected fiber tow, said selected thermoplastic resin having a melting point;
preparing said fiber tow for impregnation by said selected thermoplastic resin, wherein the step of preparing said fiber tow for impregnation by said thermoplastic resin includes the steps of drying said fiber tow, spreading said fiber tow to a selected bandwidth, and heating said fiber tow to a selected temperature, wherein said selected temperature is at least said melting point of said selected thermoplastic resin;
heating a selected portion of a workpiece to said melting point of said thermoplastic resin, wherein said workpiece is selected from a group consisting of a liner of a Type II pressure vessel, a Type III pressure vessel, and a Type IV pressure vessel;
reducing viscosity of said thermoplastic resin under pressure by heating said thermoplastic resin to said melting point of said thermoplastic resin;
impregnating said prepared molten thermoplastic resin into said prepared fiber tow under pressure at a filament winding head, thereby creating a molten fiber resin composite towpreg and immediately applying a first layer of said molten fiber resin composite towpreg to said heated surface of said workpiece whereby a molten state of said molten fiber towpreg is maintained during a wrapping procedure thereby resulting in said molten fiber resin composite towpreg more efficiently adhering to the heated surface of the workpiece;
heating a selected portion of said workpiece having an applied layer of said fiber resin composite towpreg, or directly heating the previously applied layer of said fiber resin composite towpreg to said melting point of said thermoplastic resin whereby said applied layer of said fiber resin composite towpreg is remelted prior to applying an additional layer of molten fiber resin composite towpreg;
applying an additional layer of molten fiber resin composite towpreg to said molten applied layer of fiber resin composite towpreg under pressure whereby applying said molten fiber resin composite towpreg to an area of molten fiber resin composite towpreg previously applied to said workpiece allows successive molten fiber resin composite towpreg layers to adhere to one another and further allows individual filaments within said molten fiber resin composite towpreg to slide relative to one another, thereby effectively eliminating catenary, wrinkles, and creases within the fiber resin composite overwrap; and compacting and consolidating said molten fiber resin composite towpreg layers to one another with a secondary heating source and under pressure thereby removing entrapped air;

whereby said fiber resin composite overwrap is not released from said workpiece.

* * * * *